United States Patent
Takahashi

(10) Patent No.: US 9,705,398 B2
(45) Date of Patent: Jul. 11, 2017

(54) CONTROL CIRCUIT HAVING SIGNAL PROCESSING CIRCUIT AND METHOD FOR DRIVING THE CONTROL CIRCUIT

(71) Applicant: Semiconductor Energy Laboratory Co., Ltd., Atsugi-shi, Kanagawa-ken (JP)

(72) Inventor: Kei Takahashi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 663 days.

(21) Appl. No.: 13/873,311

(22) Filed: Apr. 30, 2013

(65) Prior Publication Data

US 2013/0293138 A1 Nov. 7, 2013

(30) Foreign Application Priority Data

May 2, 2012 (JP) .................. 2012-105233

(51) Int. Cl.
*H02M 3/156* (2006.01)
*H05B 33/08* (2006.01)
(Continued)

(52) U.S. Cl.
CPC ........... *H02M 3/156* (2013.01); *H02M 3/157* (2013.01); *H05B 33/0815* (2013.01);
(Continued)

(58) Field of Classification Search
CPC ................. H02M 3/156; H02M 3/157; H02M 2001/0006; H02M 2001/0032; H05B 33/0815; H05B 33/0896; Y02B 70/16
See application file for complete search history.

(56) References Cited

U.S. PATENT DOCUMENTS 4,739,396 A 4/1988 Hyatt
5,444,457 A 8/1995 Hotto
(Continued)

FOREIGN PATENT DOCUMENTS

EP 1 737 044 A1 12/2006
EP 2 226 847 A2 9/2010
(Continued)

OTHER PUBLICATIONS

Ohara, H et al., "Amorphous In-Ga-Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.
(Continued)

*Primary Examiner* — Patrick O'Neill
(74) *Attorney, Agent, or Firm* — Fish & Richardson P.C.

(57) ABSTRACT

Disclosed is a signal processing circuit including an analog-to-digital converter, an arithmetic processing unit electrically connected to the analog-to-digital converter, and a first register electrically connected to the arithmetic processing unit. The extremely small off-state current of a transistor included in the first register allows the first register to retain a signal output from the arithmetic processing unit. This structure enables stationary driving of a load even if the signal processing circuit is turned off, which contributes to a reduction in power consumption of an electronic device having the load.

9 Claims, 11 Drawing Sheets

(51) Int. Cl.
*H02M 3/157* (2006.01)
*H02M 1/00* (2006.01)

(52) U.S. Cl.
CPC . *H05B 33/0896* (2013.01); *H02M 2001/0006* (2013.01); *H02M 2001/0032* (2013.01); *Y02B 70/16* (2013.01)

(56) References Cited

U.S. PATENT DOCUMENTS

| | | | |
|---|---|---|---|
| 5,528,032 A | 6/1996 | Uchiyama | |
| 5,594,631 A * | 1/1997 | Katoozi | H02M 3/157 323/283 |
| 5,731,856 A | 3/1998 | Kim et al. | |
| 5,736,879 A | 4/1998 | Pham | |
| 5,744,864 A | 4/1998 | Cillessen et al. | |
| 6,127,816 A | 10/2000 | Hirst | |
| 6,134,578 A | 10/2000 | Ehlig et al. | |
| 6,294,274 B1 | 9/2001 | Kawazoe et al. | |
| 6,329,940 B1 | 12/2001 | Dedic | |
| 6,421,754 B1 | 7/2002 | Kau et al. | |
| 6,563,174 B2 | 5/2003 | Kawasaki et al. | |
| 6,727,522 B1 | 4/2004 | Kawasaki et al. | |
| 6,853,170 B2 | 2/2005 | Miyazaki | |
| 6,907,536 B2 | 6/2005 | Takahashi et al. | |
| 6,933,709 B2 * | 8/2005 | Chapuis | H02M 3/157 323/282 |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,084,700 B2 | 8/2006 | Haraguchi et al. | |
| 7,105,868 B2 | 9/2006 | Nause et al. | |
| 7,128,270 B2 | 10/2006 | Silverbrook et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,362,083 B2 | 4/2008 | Scoones et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,595,620 B2 | 9/2009 | Sakai et al. | |
| 7,605,940 B2 | 10/2009 | Silverbrook et al. | |
| 7,652,460 B2 * | 1/2010 | Chang | H02M 3/157 323/224 |
| 7,656,946 B2 | 2/2010 | Morishima | |
| 7,674,650 B2 | 3/2010 | Akimoto et al. | |
| 7,732,819 B2 | 6/2010 | Akimoto et al. | |
| 7,990,122 B2 | 8/2011 | Sase et al. | |
| 8,046,615 B2 | 10/2011 | Taguchi et al. | |
| 8,247,802 B2 | 8/2012 | Nomura et al. | |
| 8,362,538 B2 | 1/2013 | Koyama et al. | |
| 8,618,586 B2 | 12/2013 | Koyama et al. | |
| 8,710,762 B2 | 4/2014 | Takahashi et al. | |
| 8,823,349 B2 * | 9/2014 | Kajiyama | H02M 3/157 323/283 |
| 8,878,172 B2 | 11/2014 | Ito et al. | |
| 9,111,806 B2 | 8/2015 | Ito et al. | |
| 9,407,269 B2 | 8/2016 | Koyama et al. | |
| 9,543,835 B2 | 1/2017 | Takahashi et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0055687 A1 | 3/2006 | Sheu et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0080905 A1 | 4/2007 | Takahara | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296567 A1 | 12/2008 | Irving et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0226495 A1 | 9/2010 | Kelly et al. | |
| 2010/0308654 A1 | 12/2010 | Chen | |
| 2011/0121878 A1 * | 5/2011 | Kato | G11C 7/04 327/215 |
| 2011/0304311 A1 | 12/2011 | Takahashi et al. | |
| 2012/0086422 A1 * | 4/2012 | Ito | H02M 3/156 323/284 |
| 2012/0274401 A1 | 11/2012 | Watanabe | |

FOREIGN PATENT DOCUMENTS

| | | |
|---|---|---|
| JP | 60-198861 A | 10/1985 |
| JP | 63-210022 A | 8/1988 |

(56) References Cited

FOREIGN PATENT DOCUMENTS

| JP | 63-210023 A | 8/1988 |
|---|---|---|
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-275697 A | 9/1994 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-085151 A | 3/2006 |
| JP | 2008-109610 A | 5/2008 |
| JP | 2009-116851 A | 5/2009 |
| JP | 2011-151796 A | 8/2011 |
| JP | 2011-216663 A | 10/2011 |
| JP | 2011-234519 A | 11/2011 |
| JP | 2012-019682 A | 1/2012 |
| WO | 2004/114391 A1 | 12/2004 |
| WO | WO-2011/078373 | 6/2011 |
| WO | WO-2011/155295 | 12/2011 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium-Gallium-Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by PEALD Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor On SrTiO3 With Sputtered Al2O3 Gate Insulator," Appl. Phys. Lett. (Applied Physics Letters), Sep. 1, 2005, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.

(56) References Cited

OTHER PUBLICATIONS

Hirao, T et al., "Novel Top-Gate Zinc Oxide Thin-Film Transistors (ZnO TFTs) for AMLCDS," Journal of the SID , 2007, vol. 15, No. 1, pp. 17-22.
Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.
Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.
Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda, T et al., "Full-Functional System Liquid Crystal Display Using CG-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, No. 16, pp. 165202-1-165202-22.
Janotti, A et al., "Oxygen Vacancies in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.
Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.
Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.
Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.
Kikuchi, H et al., "Polymer-Stabilized Liquid Crystal Blue Phases," Nature Materials, Sep. 1, 2002, vol. 1, pp. 64-68.
Kim, S et al., "High-Performance oxide thin film transistors passivated by various gas plasmas," The Electrochemical Society, 214th ECS Meeting, 2008, No. 2317, 1 page.
Kimizuka, N et al., "SPINEL,YbFe2O4, and Yb2Fe3O7 Types of Structures for Compounds in the IN2O3 and SC2O3—A2O3—Bo Systems [a; Fe, Ga, or Al; B: Mg, Mn, Fe, Ni, Cu,or Zn] at Temperatures Over 1000° C.," Journal of Solid State Chemistry, 1985, vol. 60, pp. 382-384.
Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System," Journal of Solid State Chemistry, Apr. 1, 1995, vol. 116, No. 1, pp. 170-178.
Kitzerow, H et al., "Observation of Blue Phases in Chiral Networks," Liquid Crystals, 1993, vol. 14, No. 3, pp. 911-916.
Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.
Lee, H et al., "Current Status of, Challenges to, and Perspective View of AM-OLED," IDW '06 : Proceedings of the 13th International Display Workshops, Dec. 7, 2006, pp. 663-666.
Lee, J et al., "World'S Largest (15-Inch) XGA AMLCD Panel Using IGZO Oxide TFT," SID Digest '08 : SID International Symposium Digest of Technical Papers, May 20, 2008, vol. 39, pp. 625-628.
Lee, M et al., "15.4: Excellent Performance of Indium-Oxide—Based Thin-Film Transistors by DC Sputtering," SID Digest '09 : SID International Symposium Digest of Technical Papers, May 31, 2009, pp. 191-193.
Li, C et al "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "SUFTLA Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," IDW '08 : Proceedings of the 6th International Display Workshops, Dec. 3, 2008, pp. 581-584.
Nakamura, "Synthesis of Homologous Compound with New Long-Period Structure," NIRIM Newsletter, Mar. 1995, vol. 150, pp. 1-4 with English translation.
Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.
Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.
Oba, F et al., "Defect energetics in ZnO: A hybrid Hartree-Fock density functional study," Phys. Rev. B (Physical Review. B), 2008, vol. 77, pp. 245202-1-245202-6.
Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.
Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

\* cited by examiner

CONTROL CIRCUIT HAVING SIGNAL PROCESSING CIRCUIT AND METHOD FOR DRIVING THE CONTROL CIRCUIT

BACKGROUND OF THE INVENTION

1. Field of the Invention

The present invention relates to a signal processing circuit, a driving method of the signal processing circuit, and a control circuit, and particularly relates to a control circuit which can stop supply of power to a signal processing circuit.

2. Description of the Related Art

In recent years, a reduction in power consumption of an electronic device has been highly required. To reduce power consumption of an electronic device, operation of each logic circuit is controlled in accordance with an operative state of a control circuit.

One of driving methods for reducing power consumption of a control circuit is called power gating. In the power gating, in a period during which a control circuit does not need to perform arithmetic processing, supply of electric power to part of the control circuit (e.g., arithmetic unit) is stopped to prevent waste of power (Patent Document 1).

REFERENCE

Patent Document

[Patent Document 1] Japanese Published Patent Application No. 2009-116851

SUMMARY OF THE INVENTION

However, in the case where a load in a power supply circuit illustrated in FIG. 3 is variable, for example, at the time of sending a signal from a signal processing circuit, which is part of a control circuit, to a pulse width modulator, a signal fed back to the control circuit is not constant because of the variation in load; accordingly, an output signal of the control circuit, which is driven from a difference between a voltage of a reference signal and a voltage of the fed-back signal, is not constant. As a result, power for arithmetic processing must be supplied to the control circuit all the time.

Further, even when a static load without a variation or with an extremely small variation (a load which can maintain a state where a constant voltage and a constant current are applied or a state where their variation is extremely small during operation, e.g., light emitting diode (LED) lighting or organic light emitting diode (OLED) lighting) is operated by an extremely low current, a control circuit keeps consuming power as long as a current is supplied from a power supply to the control circuit. Thus, power consumed by the control circuit cannot be sufficiently reduced even in such a case.

In view of the above problems, an object of one embodiment of the disclosed invention is to provide a signal processing circuit which consumes less power and outputs a stable output signal. Another object is to provide the signal processing circuit to reduce power consumption of a control circuit.

In one embodiment of the present invention, a control circuit includes at least a signal processing circuit and a pulse width modulator. Data is retained in a storage circuit in the signal processing circuit, and then power supply to part of a signal processing circuit which is not being used is stopped. A specific configuration will be described below.

One embodiment of the present invention is a signal processing circuit including an analog-to-digital converter (hereinafter referred to as an AD converter) and a processor. The processor includes an arithmetic processing unit and a first register. A reference signal and a feedback signal output from a load are input to the AD converter. An output signal of the AD converter and an output signal of the first register are input to the arithmetic processing unit. An output signal of the arithmetic processing unit is input to the first register.

One embodiment of the present invention is a control circuit including a signal processing circuit and a pulse width modulator. The signal processing circuit includes an AD converter and a processor. The processor includes an arithmetic processing unit and a first register. The pulse width modulator includes a digital pulse width modulator including a second register, and a clock generation circuit. A reference signal and a feedback signal output from a load are input to the AD converter. An output signal of the AD converter and an output signal of the first register are input to the arithmetic processing unit. An output signal of the arithmetic processing unit is input to the first register and the second register which is included in the digital pulse width modulator. A signal generated by the clock generation circuit is input to the digital pulse width modulator. The load is in a state where a constant voltage and a constant current are applied when an output of the first register is constant.

In the above configuration, at least part of the processor preferably includes a transistor whose channel region is formed using a semiconductor material having a band gap wider than that of silicon.

Another embodiment of the present invention is a signal processing circuit including a trans conductance amplifier (hereinafter referred to as a Gm amplifier) and a latch circuit. The latch circuit includes a transistor, a gate input terminal, and a phase compensation holding circuit. The transistor contains a semiconductor material whose band gap is wider than that of silicon in a channel region. A reference signal and a feedback signal output from a load are input to the Gm amplifier, and an output signal of the Gm amplifier is input to one of a source and a drain of the transistor. A gate of the transistor is electrically connected to the gate input terminal and the other of the source and the drain of the transistor is electrically connected to the phase compensation holding circuit.

Another embodiment of the present invention is a control circuit including a signal processing circuit and a pulse width modulator. The signal processing circuit includes a Gm amplifier and a latch circuit. The latch circuit includes a transistor, a gate input terminal, and a phase compensation holding circuit. The pulse width modulator includes a comparator and a triangle wave generator. The transistor contains a semiconductor material whose band gap is wider than that of silicon in a channel region. A reference signal and a feedback signal output from a load are input to the Gm amplifier and an output signal of the Gm amplifier is input to one of a source and a drain of the transistor. A gate of the transistor is electrically connected to the gate input terminal and the other of the source and the drain of the transistor is electrically connected to the phase compensation holding circuit and the comparator. A signal generated by the triangle wave generator is input to the comparator.

In the above configuration, the load may be LED lighting or OLED lighting.

In the above configuration, the semiconductor material whose band gap is wider than that of silicon is preferably an oxide semiconductor.

In the above configuration, the transistor whose channel region is formed using an oxide semiconductor preferably shows an off-state current per channel width of lower than or equal to $1\times10^{-19}$ A/μm.

With such a configuration, an output signal of a signal processing circuit can be stable and power consumption of the signal processing circuit can be reduced. Further, power consumption of a control circuit can be reduced by provision of the signal processing circuit.

DETAILED DESCRIPTION OF THE INVENTION

Figure 1:
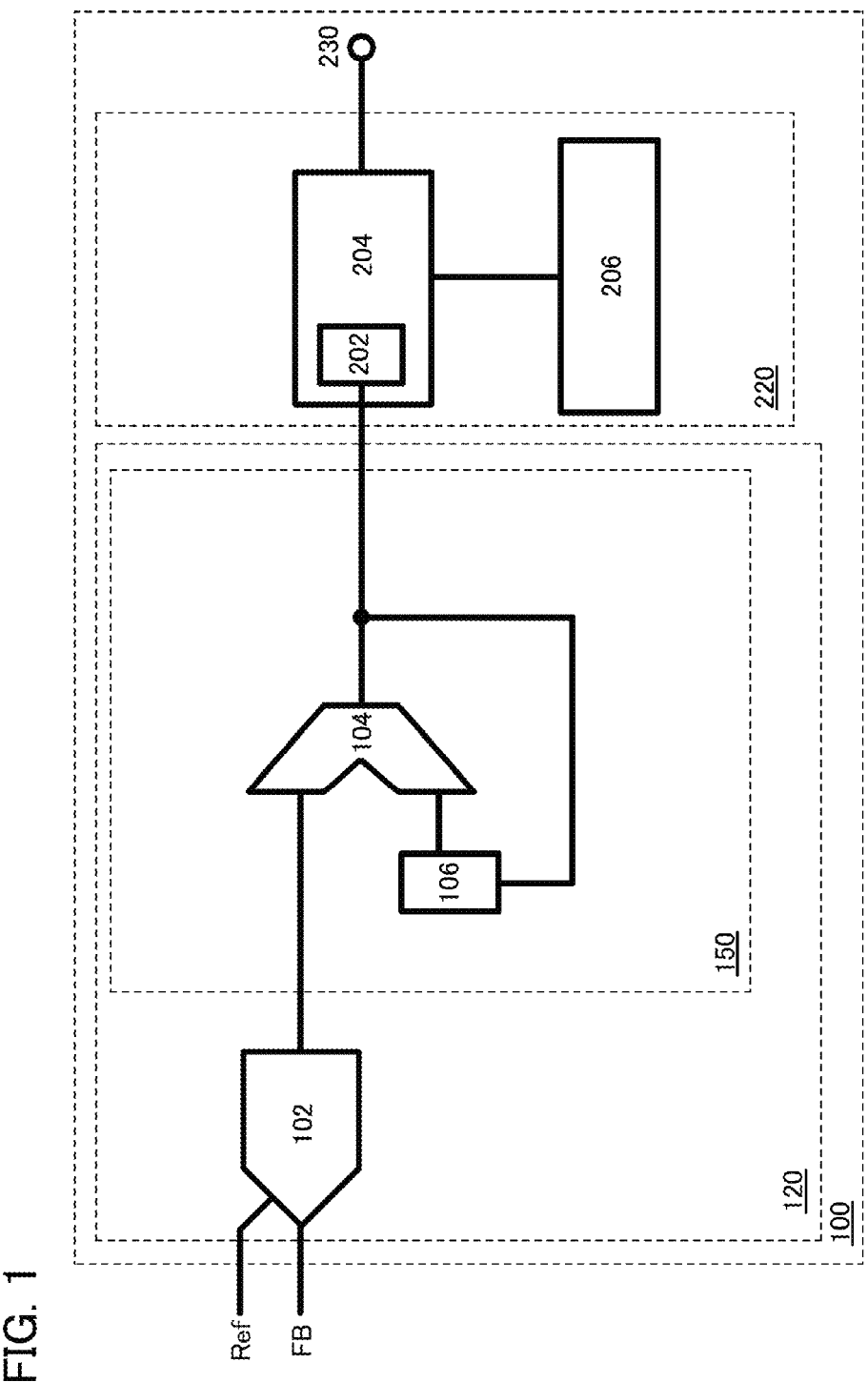
FIG. 1 is a block diagram of a control circuit.

Hereinafter, embodiments of the present invention will be described in detail with reference to the accompanying drawings. Note that the present invention is not limited to the description below, and it is easily understood by those skilled in the art that a variety of changes and modifications can be made without departing from the spirit and scope of the present invention. Accordingly, the invention should not be construed as being limited to the description of the embodiments below.

Note that functions of the "source" and "drain" may be switched in the case where transistors of different polarities are employed or in the case where the direction of a current flow changes in a circuit operation, for example. Thus, the terms "source" and "drain" can be replaced with each other in this specification.

The term "electrically connected" includes the case where components are connected through an "object having any electric function". There is no particular limitation on an object having any electric function as long as electric signals can be transmitted and received between the components connected through the object.

The position, size, range, or the like of each component illustrated in drawings and the like is not accurately represented in some cases for easy understanding. Thus, the disclosed invention is not necessarily limited to the position, size, range, and the like in the drawings and the like.

Ordinal numbers such as "first", "second", and "third" are used in order to avoid confusion among components.

In this specification, a term "parallel" indicates that the angle formed between two straight lines is greater than or equal to $-10°$ and less than or equal to $10°$, and accordingly also includes the case where the angle is greater than or equal to $-5°$ and less than or equal to $5°$. In addition, a term "perpendicular" indicates that the angle formed between two straight lines is greater than or equal to $80°$ and less than or equal to $100°$, and accordingly includes the case where the angle is greater than or equal to $85°$ and less than or equal to $95°$.

Embodiment 1

In this embodiment, a control circuit 100 of one embodiment of the present invention will be described with reference to FIG. 1.

<Example of Circuit Configuration>

FIG. 1 is a block diagram of the control circuit 100.

The control circuit 100 includes a signal processing circuit 120 and a pulse width modulator 220. The signal processing circuit 120 includes an AD converter 102 and a processor 150. The processor 150 includes an arithmetic processing unit 104 and a register 106. The pulse width modulator 220 includes a digital pulse width modulator 204 including a register 202, and a clock generation circuit 206.

The AD converter 102 is electrically connected to a wiring to which a reference signal Ref is input, a wiring supplied with a feedback signal FB output from a load which is in a state where a constant voltage and a constant current are applied when an output of the register 106 is constant, and the arithmetic processing unit 104. An output signal of the arithmetic processing unit 104 is input to the register 106 and the register 202. A signal generated by the clock generation circuit 206 is input to the digital pulse width modulator 204. An output signal of the digital pulse width modulator 204 is input to an output terminal 230 (corresponding to GS in the power supply circuit illustrated in FIG. 3) of the control circuit 100.

Further, a register such as an accumulator which retains data, an address register which is used to specify an address for accessing a memory, or a program counter which indicates an address of a main memory storing an instruction which is to be executed next can be connected as appropriate depending on the intended use.

The reference signal Ref is output from a reference voltage generation circuit (not illustrated).

A transistor included in at least part of the processor 150 (e.g., the register 106) preferably has an extremely low off-state current (leakage current) per channel width of less than or equal to $1\times10^{-19}$ A/μm. For example, a transistor whose channel region is formed using an oxide semiconductor, which is a wide band gap semiconductor, is preferably used.

Since the off-state current of the aforementioned transistor is extremely low, when the output signal of the arithmetic processing unit 104 is retained and then the transistor is turned off, a potential of the output signal of the arithmetic processing unit 104 can be kept constant or almost constant. Accordingly, accurate data can be retained in the register 106, for example.

Note that a semiconductor having a band gap greater than or equal to 2 eV, preferably greater than or equal to 2.5 eV, more preferably greater than or equal to 3 eV is used as the wide band gap semiconductor.

Data is retained in a node FN which is electrically connected to one of a source and a drain of the transistor whose channel region is formed using the oxide semiconductor which is the wide band gap semiconductor, and which exists in a floating state when the transistor is turned off. As mentioned above, the off-state current of such a transistor is extremely low. Thus, when the transistor is turned off, the potential of the node FN can be kept constant or almost constant. Consequently, data can be accurately retained in the control circuit.

The energy gap of an oxide semiconductor is greater than or equal to 3.0 eV, which is much larger than the band gap of silicon (1.1 eV).

The off-resistance of the transistor (resistance between the source and the drain when the transistor is in an off state) is inversely proportional to the concentration of carriers thermally excited in a semiconductor film where a channel region is formed. Since the band gap of silicon is 1.1 eV in the absence of carrier caused by a donor or an acceptor (i.e., in the case of an intrinsic semiconductor), the concentration of thermally excited carriers at room temperature (300 K) is approximately $1 \times 10^{11}$ cm$^3$.

On the other hand, in the case of a semiconductor whose band gap is 3.2 eV (an oxide semiconductor, here), the concentration of thermally excited carriers is approximately $1 \times 10^{-7}$ cm$^{-3}$ at room temperature. When the electron mobility is the same, the resistivity is inversely proportional to the carrier concentration; thus, the resistivity of the semiconductor whose band gap is 3.2 eV is 18 orders of magnitude higher than that of silicon.

To demonstrate an "extremely low off-state current" of a transistor whose channel region is formed using the oxide semiconductor which is the wide band gap semiconductor, measurement results of the off-state current of a transistor including a highly purified oxide semiconductor will be described.

<Measurement of Off-State Current of Transistor Using Oxide Semiconductor>

Figure 6:
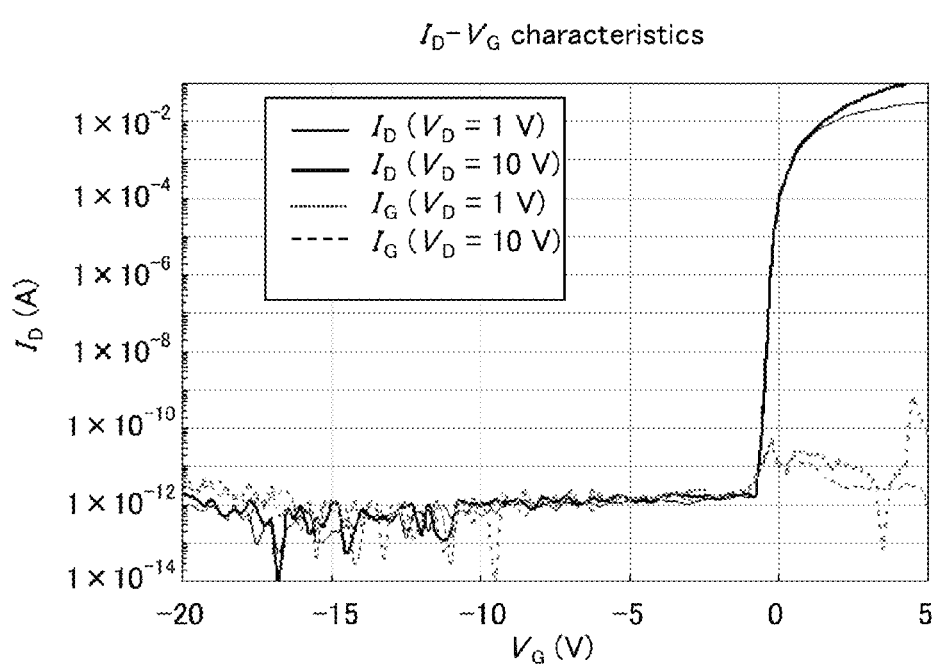
FIG. 6 is a graph showing characteristics of a transistor including an oxide semiconductor.

First, a transistor with a channel width W of 1 m, which is sufficiently wide, was prepared in consideration of the very low off-state current of a transistor including a highly purified oxide semiconductor, and the off-state current was measured. FIG. 6 shows the results obtained by measurement of the off-state current of the transistor. In FIG. 6, the horizontal axis shows gate voltage $V_G$ and the vertical axis shows drain current $I_D$. In the case where the drain voltage $V_D$ is +1 V or +10 V and the gate voltage $V_G$ is in a range of −5 V to −20 V, the off-state current of the transistor is found to be lower than or equal to $1 \times 10^{-12}$ A which is the detection limit. Moreover, it is found that the off-state current of the transistor (per unit channel width (1 μm)) is lower than or equal to 1 aA ($1 \times 10^{-18}$ A).

Next, the results obtained by more accurately measurements of the off-state current will be described. As described above, the off-state current of the transistor including a highly purified oxide semiconductor is found to be lower than or equal to $1 \times 10^{-12}$ A which is the detection limit of the measurement equipment. Thus, an element for characteristic evaluation was prepared, and the off-state current was measured more accurately.

First, the element for characteristic evaluation used for the measurement will be described with reference to FIG. 7.

Note that in a circuit diagram in this specification, a transistor including an oxide semiconductor is denoted by a symbol "OS".

Figure 7:
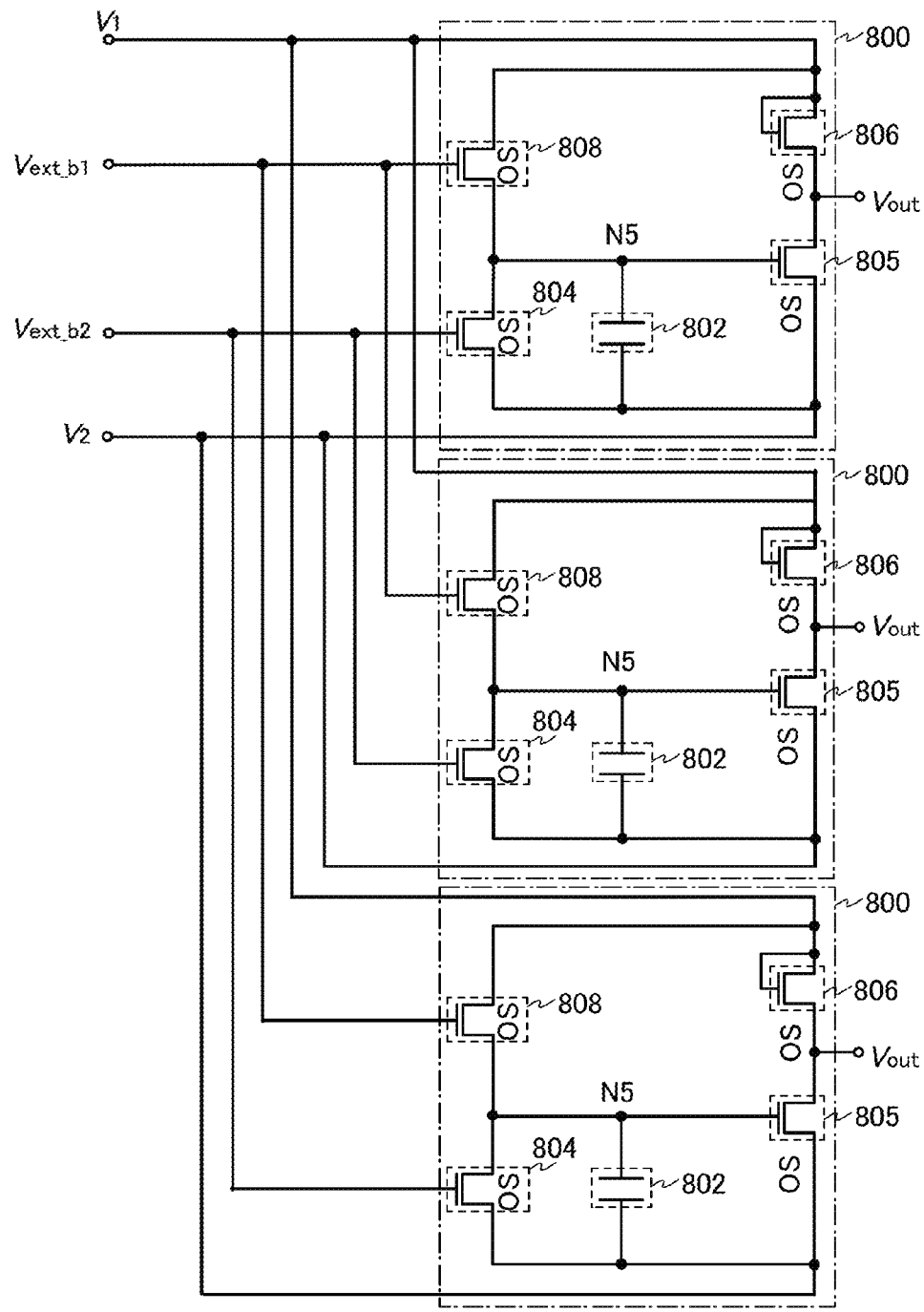
FIG. 7 is a diagram of a circuit for evaluating characteristics of a transistor including an oxide semiconductor.

In the element for characteristic evaluation shown in FIG. 7, three measurement systems 800 are connected in parallel. The measurement system 800 includes a capacitor 802, a transistor 804, a transistor 805, a transistor 806, and a transistor 808. In the transistor 804, the transistor 805, the transistor 806, and the transistor 808, a highly purified oxide semiconductor was employed.

In the measurement system 800, one of a source and a drain of the transistor 804, one terminal of the capacitor 802, and one of a source and a drain of the transistor 805 are electrically connected to a power source (for supplying $V_2$). The other of the source and the drain of the transistor 804, one of a source and a drain of the transistor 808, the other terminal of the capacitor 802, and a gate of the transistor 805 are electrically connected to one another. The other of the source and the drain of the transistor 808, one of a source and a drain of the transistor 806, and a gate of the transistor 806 are electrically connected to a power source (for supplying $V_1$). The other of the source and the drain of the transistor 805 and the other of the source and the drain of the transistor 806 are electrically connected to each other to provide an output terminal.

A potential $V_{ext\_b2}$ for controlling an on state and an off state of the transistor 804 is supplied to the gate of the transistor 804. A potential $V_{ext\_b1}$ for controlling an on state and an off state of the transistor 808 is supplied to the gate of the transistor 808. A potential $V_{Out}$ is output from the output terminal.

Next, a method of current measurement with the use of the element for characteristic evaluation will be described.

First, an initial period in which a potential difference is applied to measure the off-state current will be described. In the initial period, the potential $V_{ext\_b1}$ for turning on the transistor 808 is input to the gate of the transistor 808. Accordingly, the potential $V_1$ is supplied to a node N5 that is electrically connected to the other of the source and the drain of the transistor 804 (that is, the node electrically connected to one of the source and the drain of the transistor 808, the other terminal of the capacitor 802, and the gate of the transistor 805). Here, the potential $V_1$ is, for example, a high potential. The transistor 804 is off.

After that, the potential $V_{ext\_b1}$ for turning off the transistor 808 is input to the gate of the transistor 808 so that the transistor 808 is turned off. After the transistor 808 is turned off, the potential $V_1$ is set to low. Still, the transistor 804 is off. The potential $V_2$ is the same potential as $V_1$ (that is, the potential $V_2$ is set to low). Thus, the initial period is completed. At this time, a potential difference is generated between the node N5 and one of the source and the drain of the transistor 804, and also, a potential difference is generated between the node N5 and the other of the source and the drain of the transistor 808. Thus, a current flows slightly through the transistor 804 and the transistor 808. That is, the off-state current flows.

Next, a measurement period of the off-state current is described. In the measurement period, the potential (that is, $V_2$) of one of the source and the drain of the transistor 804 and the potential (that is, $V_1$) of the other of the source and the drain of the transistor 808 are set to low and fixed. On the other hand, the potential of the node N5 is not fixed (the node N5 is in a floating state) in the measurement period. Accordingly, a current flows through the transistor 804, and the amount of electric charge stored in the node N5 is changed as time passes. The potential of the node N5 changes depending on the change in amount of electric charge stored in the node N5. That is to say, the output potential $V_{out}$ of the output terminal also varies.

Figure 8:
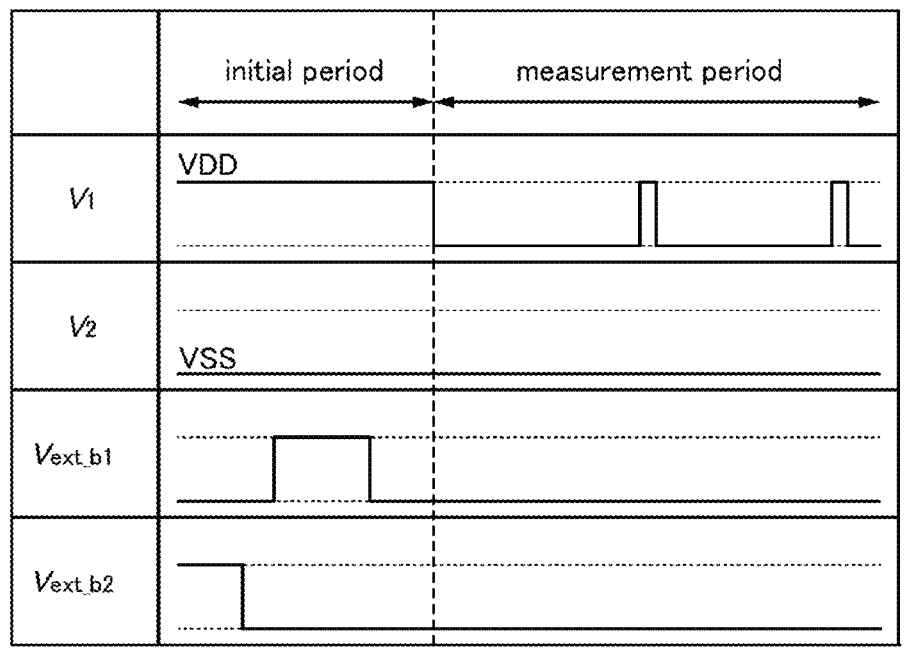
FIG. 8 is a timing chart for evaluating characteristics of a transistor including an oxide semiconductor.

FIG. 8 shows details (a timing chart) of the relation among potentials in the initial period in which the potential difference is generated and those in the subsequent measurement period.

In the initial period, first, the potential $V_{ext\_b2}$ is set to a potential (high potential) at which the transistor 804 is turned on. Thus, the potential of the node N5 becomes $V_2$, that is, a low potential ($V_{SS}$). Note that a low potential ($V_{SS}$) is not necessarily supplied to the node N5. After that, the potential $V_{ext\_b2}$ is set to a potential (low potential) at which the transistor 804 is turned off, whereby the transistor 804 is turned off. Next, the potential $V_{ext\_b1}$ is set to a potential (high potential) at which the transistor 808 is turned on. Thus, the potential of the node N5 becomes $V_1$, that is, a high potential ($V_{DD}$). After that, the potential $V_{ext\_b1}$ is set to a potential at which the transistor 808 is turned off. Accordingly, the node N5 is brought into a floating state and the initial period is completed.

In the following measurement period, the potential $V_1$ and the potential $V_2$ are individually set to potentials at which a current flows to or from the node N5. Here, the potential $V_1$ and the potential $V_2$ are low potentials ($V_{SS}$). Note that at the time of measuring the output potential $V_{Out}$, it is necessary to operate an output circuit; thus, $V_1$ is set to a high potential ($V_{DD}$) temporarily. The period in which $V_1$ is a high potential ($V_{DD}$) is set to be short so that the measurement is not influenced.

When the potential difference is generated and the measurement period is started as described above, the amount of electric charge stored in the node N5 changes depending on time, which changes the potential of the node N5. This means that the potential of the gate of the transistor 805 varies and thus, the output potential $G_{ut}$ of the output terminal also varies with the lapse of time.

A method for calculating the off-state current on the basis of the obtained output potential $V_{out}$ will be described below.

The relation between a potential $V_{N5}$ of the node N5 and the output potential $V_{Out}$ is obtained in advance before the off-state current is calculated. With this relation, the potential $V_{N5}$ of the node N5 can be obtained using the output potential $V_{Out}$. Accordingly, the potential $V_{N5}$ of the node N5 can be expressed as a function of the output potential $V_{Out}$ by the following formula.

$$V_{N5} = F(V\text{out}) \quad \text{[FORMULA 1]}$$

Electric charge $Q_{N5}$ of the node N5 can be expressed by the following formula with the use of the potential $V_{N5}$ of the node N5, capacitance $C_{N5}$ connected to the node N5, and a constant (const). Here, the capacitance $C_{N5}$ connected to the node N5 is the sum of the capacitance of the capacitor 802 and other capacitance.

$$Q_{N5} = C_{N5} V_{N5} + \text{const} \quad \text{[FORMULA 2]}$$

Since a current $I_{N5}$ flowing at the node N5 is obtained by differentiating charge flowing to the node N5 (or charge flowing from the node N5) with respect to time, the current $I_{N5}$ of the node N5 is expressed by the following formula.

$$I_{N5} = \frac{\Delta Q_{N5}}{\Delta t} = \frac{C_{N5} \cdot \Delta F(V\text{out})}{\Delta t} \quad \text{[FORMULA 3]}$$

In this manner, the current $I_{N5}$ of the node N5 can be obtained from the capacitance $C_{N5}$ connected to the node N5 and the output potential $V_{Out}$ of the output terminal.

By the above method, it is possible to measure an off-state current of a transistor.

In this embodiment, the transistor 804, the transistor 805, the transistor 806, and the transistor 808 each of which has a channel length L of 10 μm and a channel width W of 50 μm were prepared using a highly purified oxide semiconductor. In the measurement systems 800 which are arranged in parallel, the capacitances of the capacitors 802 were 100 fF, 1 pF, and 3 pF.

Note that in the measurement of this embodiment, $V_{DD}$ was 5 V and $V_{SS}$ was 0 V. In the measurement period, $V_{Out}$ was measured while the potential $V_1$ was basically set to $V_{SS}$ and changed to $V_{DD}$ for 100 msec at intervals of 10 sec to 300 sec. Further, Δt which was used in calculation of a current I which flows through the element was about 30000 sec.

Figure 9:
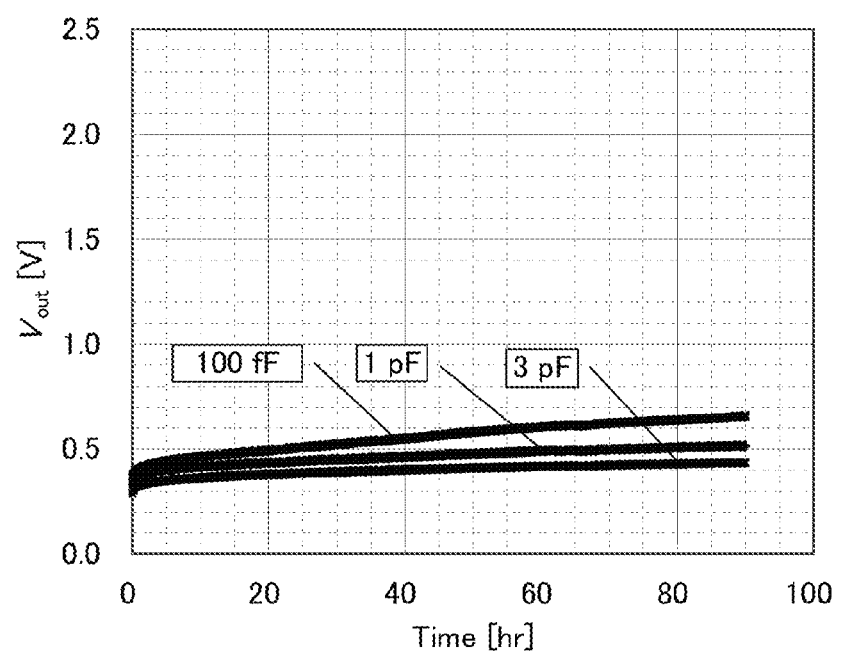
FIG. 9 is a graph showing characteristics of a transistor including an oxide semiconductor.

FIG. 9 shows the relation between the output potential $V_{Out}$ and elapsed time Time in the current measurement. As is seen in FIG. 9, the potential changes over time.

Figure 10:
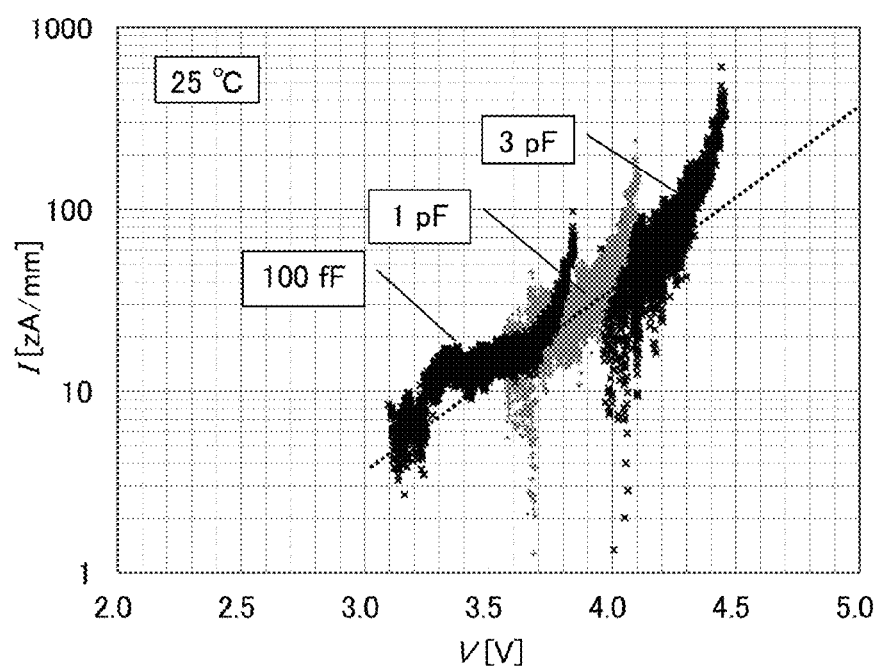
FIG. 10 is a graph showing characteristics of a transistor including an oxide semiconductor.

FIG. 10 shows the relation between source-drain voltage V and the off-state current I at a room temperature (25° C.) obtained by the above current measurement. It is found from FIG. 10 that the off-state current is approximately 40 zA/μm (i.e., $4 \times 10^{-20}$ A/μm) under the condition that the source-drain voltage is 4 V. In addition, the off-state current is lower than or equal to 10 zA/μm (lower than or equal to $1 \times 10^{-20}$ A/μm) under the condition where the source-drain voltage is 3.1 V.

Figure 11:
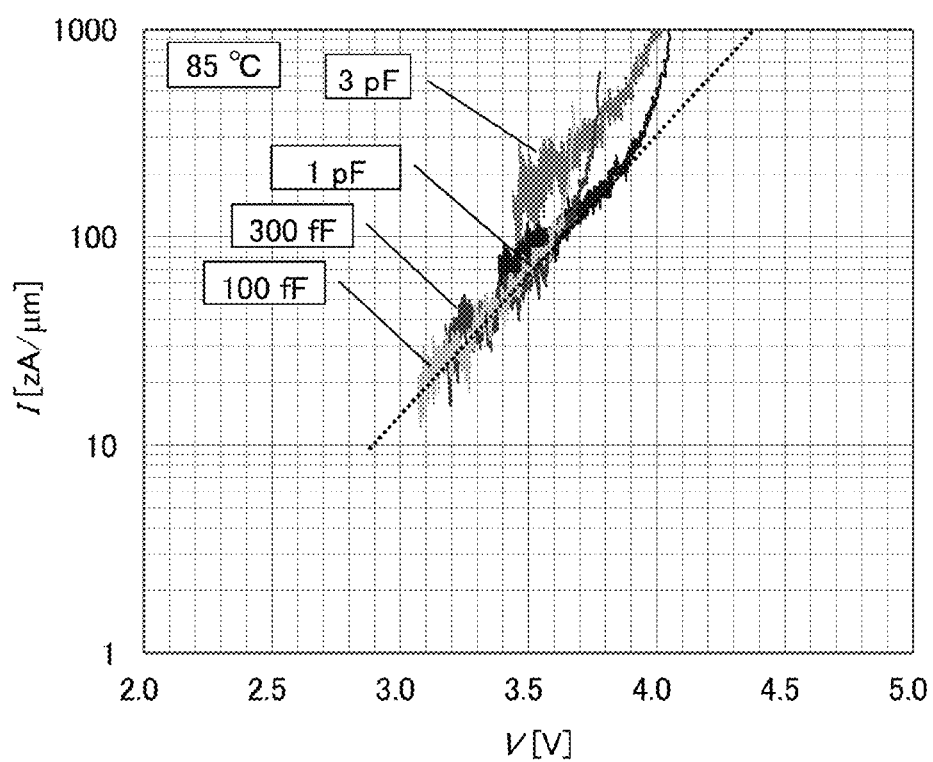
FIG. 11 is a graph showing characteristics of a transistor including an oxide semiconductor.

Further, FIG. 11 shows the relation between the source-drain voltage V and the off-state current I at 85° C. obtained by the above current measurement. It is found from FIG. 11 that the off-state current is lower than or equal to 100 zA/μm (lower than or equal to $1 \times 10^{-19}$ A/μm) when the source-drain voltage is 3.1 V.

As described above, it is confirmed from this embodiment that the off-state current is sufficiently low in a transistor including a highly purified oxide semiconductor <Example of Circuit Operation>

Next, an operation of the control circuit 100 will be described. In this embodiment, the description will be given of a driving method in which the control circuit 100 outputs a stable output signal in the case where a voltage of the feedback signal FB output from the load is lower than a predetermined voltage (voltage of the reference signal Ref).

The feedback signal FB is input to the AD converter 102 and then the AD converter 102 outputs a difference (voltage difference) obtained by subtracting the voltage of the feedback signal FB from the voltage of the reference signal Ref, as a digital signal. Since the voltage of the feedback signal FB is lower than the voltage of the reference signal Ref at this time, the AD converter 102 outputs a positive value (Step 1).

Then, the output signal of the AD converter 102 is input to the arithmetic processing unit 104. The arithmetic processing unit 104 adds the output signal of the AD converter 102 and an output signal of the register 106 and outputs the resulting signal, and the resulting signal is retained in the register 106 and the register 202. Since the output of the AD converter 102 is a positive value at this time, the output of the arithmetic processing unit 104 is increased (Step 2).

Next, the output signal of the arithmetic processing unit 104, which is retained in the register 202, is input to the digital pulse width modulator 204 (Step 3).

Figure 3:
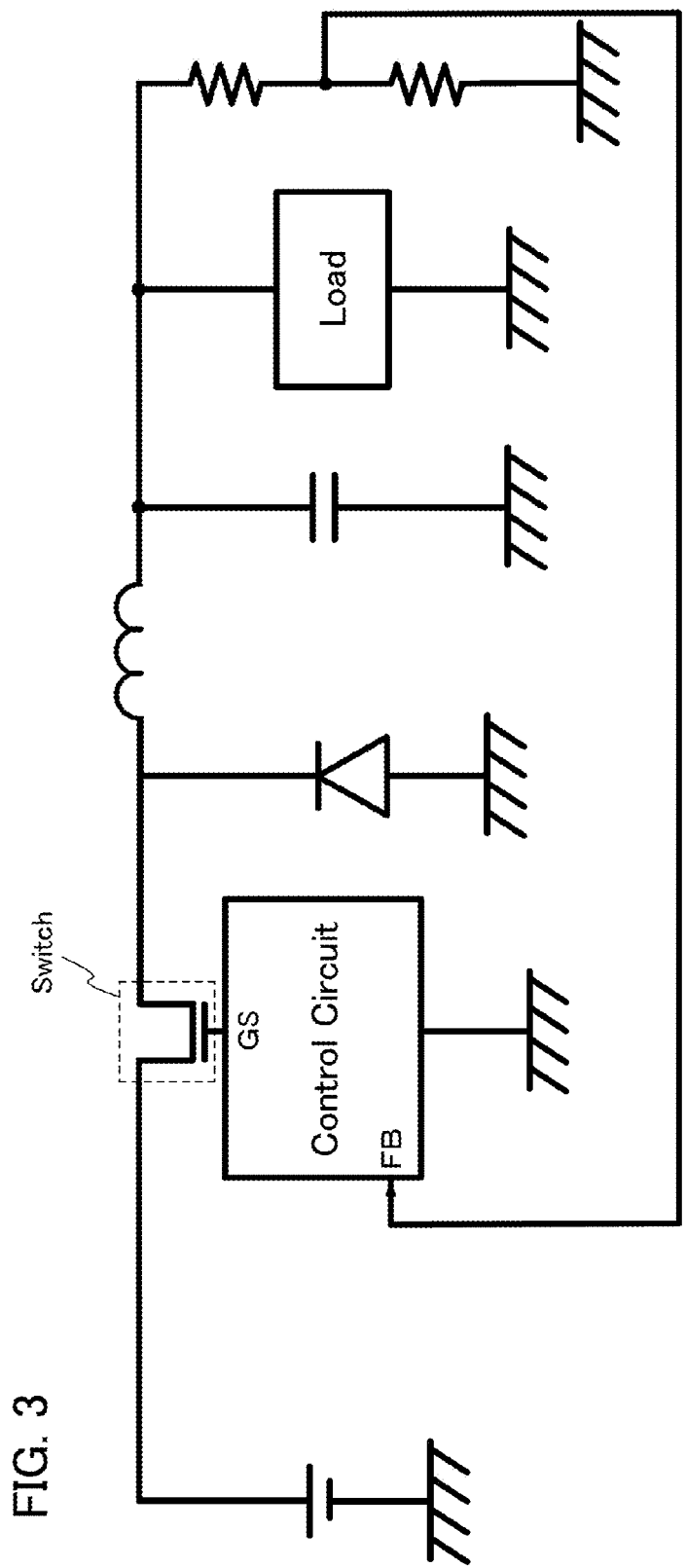
FIG. 3 illustrates an example of a power supply circuit.

Subsequently, the digital pulse width modulator 204 counts clock pulses of the clock generation circuit 206 from one. In a period during which the count number is lower than the value of the output signal of the arithmetic processing unit 104 retained in the register 202, the digital pulse width modulator 204 outputs an H-level signal (high level signal) to the output terminal 230, whereas the digital pulse width modulator 204 outputs an L-level signal (low level signal) to the output terminal 230 when the count number is higher. Since the value in the register 202 is increased at this time, a period during which an H-level signal is output extends; thus, a period during which a switch illustrated in FIG. 3 is on extends, which results in an increase in power transmitted from a power supply to a load side through an inductor. As the voltage of the load increases, the voltage of the feedback signal FB increases. When the clock pulses are further counted so that the count number is higher than the predetermined value, the count number is reset to zero, the output of the digital pulse width modulator 204 becomes an L level, and the clock pulses are counted again from one (Step 4).

After that, loop processing of Steps 1 to 4 is repeatedly executed.

After repeating the loop processing, the whole control circuit 100 enters a stationary state (Step 5).

When the whole control circuit 100 enters a stationary state, in other words, when the voltages of the reference signal Ref and the feedback signal FB of the control circuit 100 are the same, the output signal of the arithmetic processing unit 104 becomes constant. Accordingly, the proportion of a period during which an H-level signal is output from the digital pulse width modulator 204 to the output terminal 230 to a period during which an L-level signal is output also becomes constant; thus, the control circuit 100 can output a stable output signal.

Then, the signal processing circuit 120 is powered off (Step 6).

When the signal processing circuit 120 is powered off, power consumption of the whole control circuit 100 can be reduced. Since the output signal of the arithmetic processing unit 104 is retained in the register 106 in which a transistor having an extremely low off-state current is used, the output signal of the control circuit 100 can be retained even when the signal processing circuit 120 is powered off. Note that the output signal may be retained in a storage unit, instead of in the register 106, which includes a transistor having an extremely low off-state current and is provided outside the processor 150.

Next, the signal processing circuit 120 is powered on, so that the retained output signal is input to the arithmetic processing unit 104 in response to a signal from a control portion and a stable output signal of the control circuit 100 is output again.

In the case where the voltage of the feedback signal FB output from the load is higher than the predetermined voltage (voltage of the reference signal Ref), a voltage of the output signal of the AD converter 102 is a negative value. When the output of the arithmetic processing unit 104 is reduced, a period during which an L-level signal is output from the control circuit 100 extends; thus, a period during which the switch illustrated in FIG. 3 is on is shortened, which results in a reduction in power transmitted from the power supply to the load side through the inductor. As the voltage of the load reduces, the voltage of the feedback signal FB decreases.

As described above, when the output of the register 106 is constant, the whole control circuit 100 can be in a stationary state to output a stable output signal. In addition, retaining the output signal of the AD converter 102 in the register 106 through the arithmetic processing unit 104 enables the operation of the signal processing circuit 120 to be stopped; thus, power consumption of the whole control circuit 100 can be reduced. Note that LED lighting, OLED lighting, and the like which are operated at a constant voltage and a constant current are exemplified as a load included in the circuit.

The structures, methods, and the like described in this embodiment can be combined as appropriate with any of the structures, methods, and the like described in the other embodiments.

Embodiment 2

In this embodiment, a control circuit 300 of one embodiment of the present invention will be described with reference to FIG. 2.

<Example of Circuit Configuration>

Figure 2:
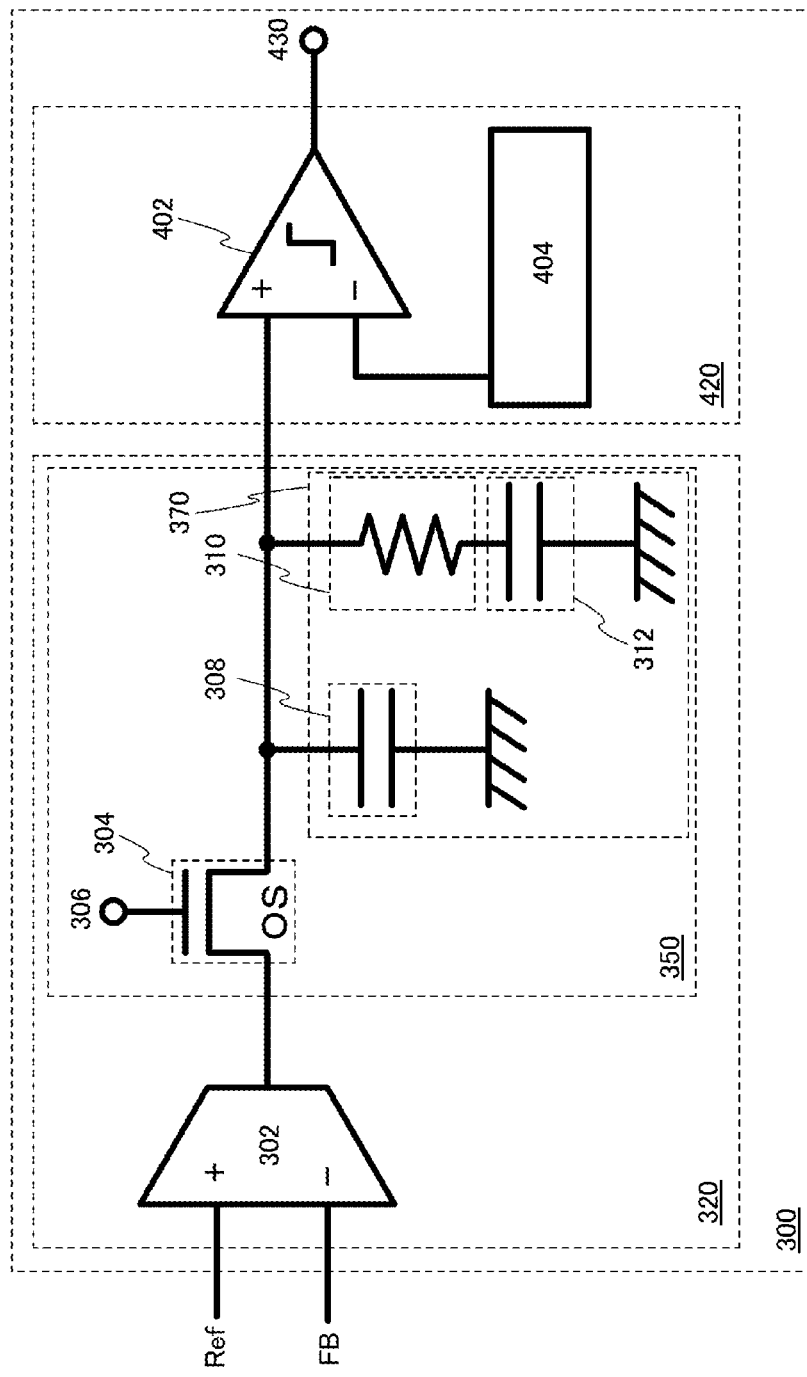
FIG. 2 is a block diagram of a control circuit.

FIG. 2 is a block diagram of the control circuit 300.

The control circuit 300 includes a signal processing circuit 320 and a pulse width modulator 420. The signal processing circuit 320 includes a Gm amplifier 302 and a latch circuit 350. The latch circuit 350 includes a transistor 304, a gate input terminal 306, and a phase compensation holding circuit 370 which functions as both a holding circuit and a phase compensation circuit. The pulse width modulator 420 includes a comparator 402 and a triangle wave generator 404.

The phase compensation holding circuit 370 includes a capacitor 308 (first capacitor), a resistor 310, and a capacitor 312 (second capacitor).

A non-inverting input terminal (hereinafter also referred to as a positive terminal) of the Gm amplifier 302 is electrically connected to a wiring from which a reference signal Ref is output, and an inverting input terminal (hereinafter also referred to as a negative terminal) is electrically connected to a wiring from which a feedback signal FB output from a load is output. An output signal of the Gm amplifier 302 is input to one of a source and a drain of the transistor 304. A gate of the transistor 304 is electrically connected to the gate input terminal 306. The other of the source and the drain of the transistor 304 is electrically connected to one terminal of the capacitor 308 in the phase compensation holding circuit 370, one terminal of the resistor 310, and a non-inverting input terminal (hereinafter also referred to as a positive terminal) of the comparator 402. Note that LED lighting, OLED lighting, and the like which are operated at a constant voltage and a constant current are exemplified as a load included in the circuit.

The other terminal of the capacitor 308 is grounded. The other terminal of the resistor 310 is electrically connected to one terminal of the capacitor 312. The other terminal of the capacitor 312 is grounded. A signal generated by the triangle wave generator 404 is input to an inverting input terminal (hereinafter also referred to as a negative terminal) of the comparator 402. An output signal of the comparator 402 is input to an output terminal 430 (corresponding to GS in the power supply circuit illustrated in FIG. 3) of the control circuit 300.

The reference signal Ref is output from a reference voltage generation circuit (not illustrated).

The Gm amplifier 302 increases a difference (voltage difference) between the voltages of the reference signal Ref and the feedback signal FB by a factor of Gm and outputs the resulting difference as a current. Here, "Gm" is proportional to the conductance (gm) of a transistor included in the Gm amplifier 302.

The transistor 304 preferably has an extremely low off-state current per channel width of lower than or equal to $1\times10^{-19}$ A/µm. For example, a transistor whose channel region is formed using an oxide semiconductor, which is a wide band gap semiconductor, is preferably used.

The phase compensation holding circuit 370 has a function of retaining the output signal of the Gm amplifier 302 in the capacitor and a function of controlling a phase of the output signal of the Gm amplifier 302. The phase of the output signal is controlled by the phase compensation holding circuit 370, so that the output signal of the Gm amplifier 302, the output signal of the comparator 402, or the like is prevented from oscillating, which enables the control circuit 300 to operate stably.

An output signal which is output from the Gm amplifier 302 and a phase of which is adjusted by the phase compensation holding circuit 370 is input to the positive terminal of the comparator 402, and a triangle or sawtooth wave signal which is output from the triangle wave generator 404 is input to the negative terminal of the comparator 402. Further, the comparator 402 generates a rectangular wave signal which has a fixed output cycle and which has a pulse width varying in accordance with the level of a signal (voltage) input to the positive terminal. Note that the comparator 402 generates and outputs, as a rectangular wave, an H-level signal when a voltage of a signal input to the positive terminal is higher than a voltage of a signal input to the negative terminal or an L-level signal when the voltage of the signal input to the positive terminal is lower than the voltage of the signal input to the negative terminal. The rectangular wave signal output from the comparator 402 is input to the output terminal 430.

<Example of Circuit Operation>

Next, an operation of the control circuit 300 will be described. In this embodiment, the description will be given of a driving method in which the control circuit 300 outputs a stable output signal in the case where the voltage of the feedback signal FB output from the load is higher than a predetermined voltage (voltage of the reference signal Ref).

First, the transistor 304 is turned on by a signal of the gate input terminal 306.

After the feedback signal FB is input to the Gm amplifier 302, the Gm amplifier 302 increases a difference (voltage difference) which is obtained by subtracting the voltage of the feedback signal FB from the voltage of the reference signal Ref by a factor of Gm and outputs the resulting difference as a current. Since the voltage of the feedback signal FB is higher than the voltage of the reference signal Ref at this time, the Gm amplifier 302 outputs a negative current (the current is input from the phase compensation holding circuit 370 to the Gm amplifier 302) (Step 1).

As the output signal (current) of the Gm amplifier 302 decreases, a voltage of the phase compensation holding circuit 370 decreases, which leads to an increase in period during which an output signal generated by the triangle wave generator 404 is higher than a voltage input to the positive terminal of the comparator 402; thus, the duty cycle of a pulse wave is reduced (Step 2).

Here, the "duty cycle" means a ratio of an-H level period to one cycle.

The reduction in duty cycle of a pulse wave, that is, a reduction in period during which the comparator 402 outputs an H-level signal to the output terminal 430 results in a reduction in period during which the switch illustrated in FIG. 3 is on; thus, power transmitted from the power supply to the load side through the inductor is reduced, and the feedback signal FB is decreased (Step 3).

After that, loop processing of Steps 1 to 3 is repeatedly executed.

After repeating the loop processing, the whole control circuit 300 enters a stationary state (Step 4).

When the whole control circuit 300 enters a stationary state, in other words, when the voltages of the reference signal Ref and the feedback signal FB of the control circuit 300 are the same, the output signal of the Gm amplifier 302 becomes constant. Accordingly, the proportion of a period during which an H-level signal is output from the comparator 402 to the output terminal 430 to a period during which an L-level signal is output also becomes constant; thus, the control circuit 300 can output a stable output signal.

When the whole control circuit 300 is brought into a stationary state, the control circuit 300 can output a stable output signal. Next, the transistor 304 is turned off by the signal of the gate input terminal 306, and the output signal of the Gm amplifier 302 is retained in the latch circuit 350 (Step 5).

The transistor 304 includes an oxide semiconductor in a channel region. Since the off-state current of the transistor is extremely low, a potential of the output signal of the Gm amplifier 302 can be kept constant or almost constant by turning off the transistor 304. Accordingly, accurate data can be retained in the latch circuit 350.

Then, the signal processing circuit 320 is powered off (Step 6).

When the signal processing circuit 320 is powered off, power consumption of the whole control circuit 300 can be reduced. Since the output signal of the Gm amplifier 302 is retained in the latch circuit 350, the output signal can be retained even when the signal processing circuit 320 is powered off.

Next, the signal processing circuit 320 is powered on, so that the retained output signal is input to the comparator 402 and a stable output signal of the control circuit 300 is output again.

In the case where the voltage of the feedback signal FB output from the load is lower than the predetermined voltage (voltage of the reference signal Ref), the Gm amplifier 302 increases a difference (voltage difference) which is obtained by subtracting the voltage of the feedback signal FB from the voltage of the reference signal Ref by a factor of Gm and outputs the resulting difference as a current, so that a period during which the output signal generated by the triangle wave generator 404 is higher than the output signal of the Gm amplifier 302 is reduced (the duty cycle of a pulse wave is increased). Accordingly, a period during which the comparator 402 outputs an H-level signal to the output terminal 430 extends, which results in an increase in period during which the switch illustrated in FIG. 3 is on. Thus, power transmitted from the power supply to the load side through the inductor is increased and the voltage of the feedback signal FB is increased.

As described above, the whole control circuit 300 can be in a stationary state to output a stable output signal. In addition, retaining the output signal of the Gm amplifier 302 in the latch circuit 350 enables the operation of the signal processing circuit 320 to be stopped; thus, power consumption of the whole control circuit 300 can be reduced. Note that LED lighting and OLED lighting which are operated at a constant voltage and a constant current are exemplified as a load included in the circuit.

The structures, methods, and the like described in this embodiment can be combined as appropriate with any of the structures, methods, and the like described in the other embodiments.

Embodiment 3

Figure 4:
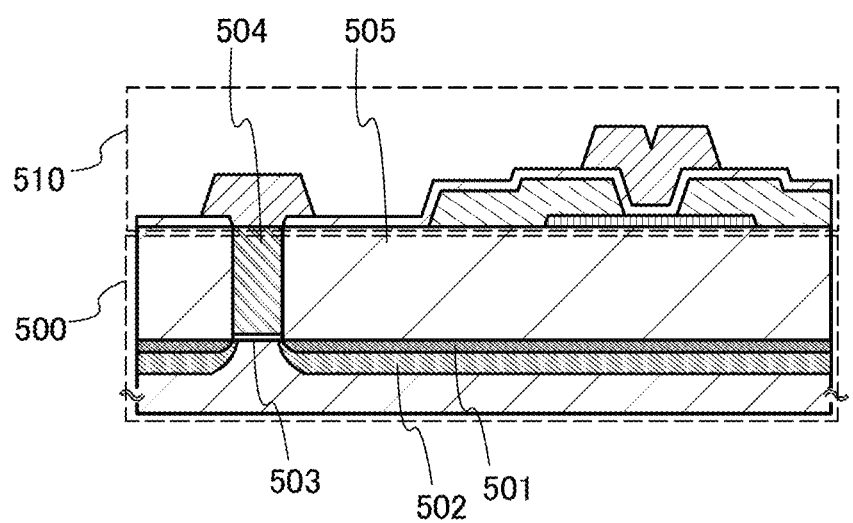
FIG. 4 is a cross-sectional view of a transistor which can be used.

In this embodiment, an example of a method for manufacturing a transistor that can be applied to the present invention will be described with reference to FIG. 4 and FIGS. 5A to 5D. FIG. 4 illustrates an example of a schematic cross-sectional structure of the transistor. In FIG. 4, a transistor with a low off-state current is formed over a transistor formed using a semiconductor substrate. Both or one of a p-channel transistor and an n-channel transistor may be provided in the semiconductor substrate.

After the transistor is formed using the semiconductor substrate, the transistor with low off-state current is formed thereover. In other words, the transistor with low off-state current is formed over a semiconductor substrate 500 provided with the transistor. As an example of the transistor with low off-state current, there is a transistor including an oxide semiconductor in a channel region.

The semiconductor substrate 500 includes high-concentration impurity regions 501 serving as a source region and a drain region, low-concentration impurity regions 502, a gate insulating film 503, a gate electrode 504, and an interlayer insulating film 505 (see FIG. 4).

Figure 5A:
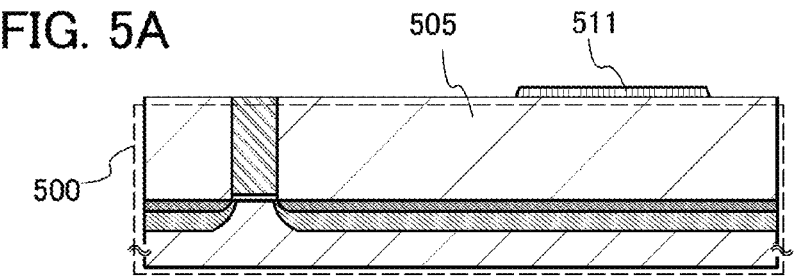
FIGS. 5A to 5D illustrate a method for manufacturing the transistor illustrated in FIG. 4.
Figure 5B:
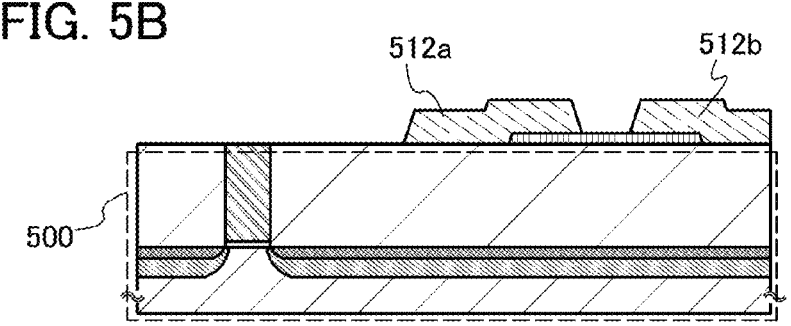
Figure 5C:
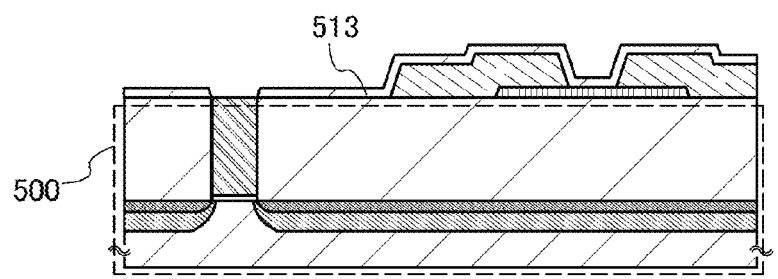
Figure 5D:
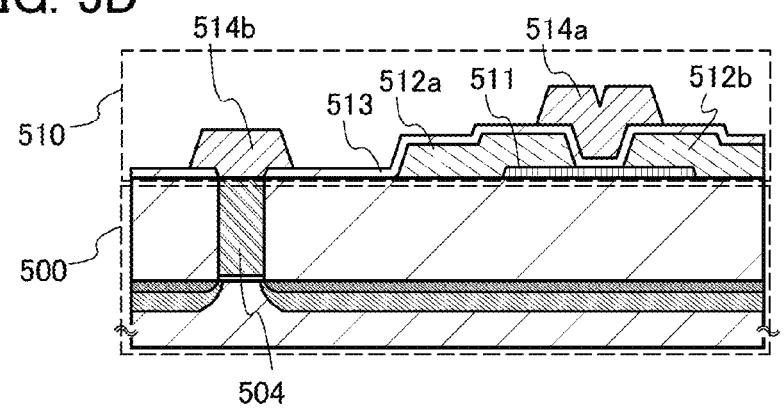

A transistor 510 including an oxide semiconductor in a channel region includes an oxide semiconductor film 511 over the semiconductor substrate 500, a source electrode 512a and a drain electrode 512b which are apart from each other and in contact with the oxide semiconductor film 511, a gate insulating film 513 over at least a channel region of the oxide semiconductor film 511, and a gate electrode 514a over the gate insulating film 513 so as to overlap with the oxide semiconductor film 511 (see FIG. 5D). Note that although not illustrated, the gate electrode 514a and an electrode 514b are electrically connected to each other and the gate electrode 504 and the electrode 514b are electrically connected to each other.

First, the oxide semiconductor film 511 is formed over the interlayer insulating film 505 (see FIG. 5A).

The interlayer insulating film 505 also functions as a base insulating film for the oxide semiconductor film 511. As the interlayer insulating film 505, for example, a single layer selected from a silicon oxide film, a gallium oxide film, an aluminum oxide film, a silicon nitride film, a silicon oxynitride film, an aluminum oxynitride film, and a silicon nitride oxide film or a stack of any of these films can be used.

Note that in this specification, "oxynitride" such as silicon oxynitride contains more oxygen than nitrogen, and "nitride oxide" such as silicon nitride oxide contains more nitrogen than oxygen.

The interlayer insulating film 505 is preferably formed using an insulating film (oxygen supply film) from which oxygen is released by heat treatment.

To released oxygen by heat treatment means that the amount of oxygen which is released by heating up to 520° C. in thermal desorption spectroscopy (TDS) analysis and converted into oxygen atoms is greater than or equal to $1.0 \times 10^{19}$ atoms/cm$^3$, preferably greater than or equal to $3.0 \times 10^{19}$ atoms/cm$^3$, further preferably greater than or equal to $1.0 \times 10^{20}$ atoms/cm$^3$, still further preferably greater than or equal to $3.0 \times 10^{20}$ atoms/cm$^3$.

Here, a method to measure the amount of released oxygen using the TDS analysis is described.

The amount of released gas in the TDS analysis is proportional to the area of a peak originating from ions of the gas. Thus, the amount of the released gas can be calculated from the ratio between the peak area of a sample and that of a standard sample. The reference value of a standard sample refers to the ratio of the density of an atom contained in a sample to the area of the peak originating from the ions of the released gas.

For example, the amount of released oxygen molecules ($N_{O2}$) from an insulating film can be found according to the following formula with the TDS analysis results of a silicon wafer containing hydrogen at a known density which is the standard sample and the TDS analysis results of the insulating film which is the measurement sample. Here, all ions having a mass-to-charge ratio (M/z) of 32 which are detected by the TDS analysis are assumed to originate from an oxygen molecule. Note that CH$_3$OH, which is given as a molecule having M/z of 32, can be ignored because it is unlikely to be present. Further, an oxygen molecule including an isotope of an oxygen atom having M/z of 17 or 18 is not taken into consideration because the proportion of such a molecule in the natural world is minimal $$N_{O2} = \frac{N_{H2}}{S_{H2}} \times S_{O2} \times a \qquad \text{[FORMULA 4]}$$

A value obtained by conversion of the amount of hydrogen molecules desorbed from the standard sample into densities is denoted by $N_{H2}$. The peak area of the hydrogen ion detected by using the standard sample is denoted by $S_{H2}$. Here, $N_{H2}/S_{H2}$ is a reference value of the standard sample. The peak area of the oxygen ion detected by using the insulating film is denoted by $S_{O2}$. Further, a is a coefficient which influences spectrum intensity in the TDS analysis. Refer to Japanese Published Patent Application No. H06-275697 for details of the above formula. Note that the measurement can be carried out with a thermal desorption spectrometer produced by ESCO Ltd., EMD-WA1000S/W, using a silicon wafer containing hydrogen atoms at $1 \times 10^{16}$ atoms/cm$^2$ as the standard sample, for example.

In the TDS analysis, oxygen is partly detected as an oxygen atom. The ratio between oxygen molecules and oxygen atoms can be calculated from the ionization rate of the oxygen molecules. Since the constant α includes the ionization rate of the oxygen molecules, the amount of the released oxygen atoms can also be estimated from the amount of the released oxygen molecules.

Note that $N_{O2}$ is the amount of the released oxygen molecules. The amount of the released oxygen converted into oxygen atoms is twice the number of the released oxygen molecules.

In the case where the hydrogen concentration in an oxygen supply film is $7.2 \times 10^{20}$ atoms/cm$^3$ or higher, variations in initial characteristics of transistors are increased, an L length dependence of electrical characteristics of a transistor is increased, and a transistor is significantly degraded by external stress; thus, the hydrogen concentration in the insulating film as an oxygen supply film is preferably controlled to be lower than $7.2 \times 10^{20}$ atoms/cm$^3$. Note that the hydrogen concentration in the oxide semiconductor film is preferably lower than or equal to $5 \times 10^{19}$ atoms/cm$^3$.

The use of an oxygen supply film allows the oxide semiconductor film to have a stoichiometric composition or a nearly stoichiometric composition. For example, in the case where the stoichiometric composition of the oxide semiconductor film is In:Ga:Zn:O=1:1:1:4 [atomic ratio], the ratio of oxygen atoms in the IGZO can be 4 or larger.

The interlayer insulating film 505 may be formed by a sputtering method, a CVD method, or the like and is preferably formed by a sputtering method. In the case where a silicon oxide film is formed as the interlayer insulating film 505, a quartz (preferably synthetic quartz) target may be used as a target, and an argon gas may be used as a sputtering gas. Alternatively, a silicon target may be used as a target, and a gas containing oxygen may be used as a sputtering gas. Note that the gas containing oxygen may be a mixed gas of an argon gas and an oxygen gas or may be an oxygen gas alone.

Between the formation of the interlayer insulating film 505 and the formation of the oxide semiconductor film 511, first heat treatment is performed. The first heat treatment is performed to remove water and hydrogen contained in the interlayer insulating film 505. The temperature of the first heat treatment may be set higher than or equal to a temperature at which water and hydrogen contained in the interlayer insulating film 505 are released (a temperature at which the release amount peaks) and lower than a temperature at which the semiconductor substrate 500 changes in property or deforms, and is set higher than or equal to 400° C. and lower than or equal to 750° C., and lower than a temperature of second heat treatment performed in a later step, for example.

The second heat treatment is performed after the oxide semiconductor film 511 is formed. The second heat treatment is performed to supply oxygen to the oxide semiconductor film 511 from the interlayer insulating film 505 which serves as a source of oxygen. Note that the timing of the second heat treatment is not limited thereto, and the second heat treatment may be performed after the oxide semiconductor film 511 is processed.

Note that it is preferable that the second heat treatment be performed in a nitrogen gas atmosphere or a rare gas atmosphere including helium, neon, argon, or the like, which does not contain hydrogen, water, a compound containing a hydroxyl group, a hydride, and the like. Alternatively, the purity of the above gas is preferably set to 6N (99.9999%) or more, more preferably 7N (99.99999%) or more (i.e., the impurity concentration is 1 ppm or less, preferably 0.1 ppm or less).

In some cases, the oxide semiconductor film 511 may be crystallized into a microcrystalline oxide semiconductor layer or a polycrystalline oxide semiconductor layer, depending on the conditions of the second heat treatment or the material of the oxide semiconductor film 511. For example, the oxide semiconductor film 511 may be crystallized into a microcrystalline oxide semiconductor layer having a degree of crystallization of greater than or equal to 90%, or greater than or equal to 80%. On the contrary, the oxide semiconductor film 511 may be an amorphous oxide semiconductor layer without a crystalline component. The oxide semiconductor film 511 may be an amorphous oxide semiconductor layer containing microcrystals (having a crystal grain size of 1 nm to 20 nm).

For the oxide semiconductor film 511, for example, an In-M-Zn—O-based material may be used. Here, a metal element M is an element whose bond energy with oxygen is higher than that of In and that of Zn. Alternatively, M is an element which has a function of suppressing elimination of oxygen from the In-M-Zn—O-based material. Owing to the effect of the metal element M, generation of oxygen vacancies in the oxide semiconductor film is suppressed. Thus, change in electrical characteristics of the transistor, which is caused by oxygen vacancies, can be reduced; accordingly, a highly reliable transistor can be obtained.

The metal element M can be, specifically, Al, Sc, Ti, V, Cr, Mn, Fe, Co, Ni, Ga, Y, Zr, Nb, Mo, Sn, La, Ce, Pr, Nd, Sm, Eu, Gd, Tb, Dy, Ho, Er, Tm, Yb, Lu, Hf, Ta, or W, and is preferably Al, Ti, Ga, Y, Zr, Ce, or HE The metal element M can be formed using one or more elements selected from the above elements. Further, Ge can be used instead of the metal element M.

Here, an increase in concentration of In in an oxide semiconductor including In, M, Zn, and O leads to an increase in carrier mobility and the carrier density, resulting in the formation of an oxide semiconductor having higher conductivity.

A structure of an oxide semiconductor film is described below. An oxide semiconductor film is classified roughly into a single-crystal oxide semiconductor film and a non-single-crystal oxide semiconductor film. The non-single-crystal oxide semiconductor film includes an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

Structural analysis of a CAAC-OS film with an X-ray diffraction (XRD) apparatus demonstrates that, when the CAAC-OS film such as that including an $InGaZnO_4$ crystal is analyzed by an out-of-plane method, a peak appears frequently at a diffraction angle (2θ) of around 31°. This peak is derived from the (009) plane of the $InGaZnO_4$ crystal, which indicates that crystals in the CAAC-OS film have c-axis alignment, and that the c-axes are aligned in a direction perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (θ scan) is performed under conditions where the sample is rotated around a normal vector of a sample surface as an axis (θ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when θ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor using the CAAC-OS film, change in electric characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

The oxide semiconductor film immediately after being formed is preferably in a state in which the proportion of oxygen is higher than that in the stoichiometric composition. For example, when the oxide semiconductor film is formed by a sputtering method, it is preferable that the film be formed in a deposition gas containing a high percentage of oxygen, and it is especially preferable that the film be formed under an oxygen atmosphere (oxygen gas: 100%). When the film is formed under such conditions, release of Zn from the film can be suppressed even when the film formation temperature is higher than or equal to 300° C., for example.

Note that the oxide semiconductor film 511 may have a structure in which a plurality of oxide semiconductor films is stacked. For example, the oxide semiconductor film 511 may be a stack of a first oxide semiconductor film and a second oxide semiconductor film that are formed using metal oxides with different compositions. For example, the first oxide semiconductor film may be formed using a three-component metal oxide, and the second oxide semiconductor film may be formed using a two-component metal oxide. Alternatively, for example, both the first oxide semiconductor film and the second oxide semiconductor film may be formed using a three-component metal oxide.

Further, it is possible that the constituent elements of the first oxide semiconductor film and the second oxide semiconductor film are the same and the compositions of the constituent elements of the first oxide semiconductor film and the second oxide semiconductor film are different. For example, the first oxide semiconductor film may have an atomic ratio of In:Ga:Zn=1:1:1, and the second oxide semiconductor film may have an atomic ratio of In:Ga:Zn=3:1:2. Alternatively, the first oxide semiconductor film may have an atomic ratio of In:Ga:Zn=1:3:2, and the second oxide semiconductor film may have an atomic ratio of In:Ga:Zn=2:1:3.

In an oxide semiconductor, the s orbital of heavy metal mainly contributes to carrier transfer, and when the In content in the oxide semiconductor is increased, overlap of the s orbitals is likely to be increased. Thus, an oxide having a composition where In>Ga has higher mobility than an oxide having a composition where In≤Ga. Further, Ga requires larger energy to form an oxygen vacancy than In; thus, an oxide having a composition where In≤Ga does not tend to form an oxygen vacancy and has stable characteristics as compared with an oxide having a composition where In>Ga.

Therefore, it is possible to improve mobility and reliability of a transistor by employing a structure in which an oxide semiconductor film closer to the gate electrode (on a channel side) contains In and Ga at a proportion satisfying In>Ga and an oxide semiconductor film farther from the gate electrode (on a back channel side) contains In and Ga at a proportion satisfying In≤Ga.

Further, oxide semiconductors having different crystallinity may be used for the first oxide semiconductor film and the second oxide semiconductor film. That is, two of a single crystal oxide semiconductor, a polycrystalline oxide semiconductor, an amorphous oxide semiconductor, and a CAAC-OS film may be combined as appropriate. When an amorphous oxide semiconductor is used for at least one of the first oxide semiconductor film and the second oxide semiconductor film, stress of the oxide semiconductor film 511 is relieved, variation in characteristics of a transistor is reduced, and reliability of the transistor can be further improved.

On the other hand, an amorphous oxide semiconductor is likely to absorb an impurity which serves as a donor, such as hydrogen, and an oxygen vacancy is likely to be generated; thus, an amorphous oxide semiconductor easily becomes n-type. For this reason, it is preferable to use an oxide semiconductor having crystallinity such as a CAAC-OS film for the oxide semiconductor film on the channel side.

Further, the oxide semiconductor film 511 may have a stacked-layer structure of three or more layers in which an amorphous oxide semiconductor film is sandwiched between plural crystalline oxide semiconductor films. Furthermore, a structure in which a crystalline oxide semiconductor film and an amorphous oxide semiconductor film are alternately stacked may be employed.

In the case where the oxide semiconductor film 511 has a stacked-layer structure of a plurality of layers, oxygen may be added each time the oxide semiconductor film is formed. For addition of oxygen, heat treatment in an oxygen atmosphere, an ion implantation method, an ion doping method, a plasma immersion ion implantation method, plasma treatment performed in an atmosphere containing oxygen, or the like can be employed.

Oxygen is added each time the oxide semiconductor film is formed, whereby an effect of reducing oxygen vacancies in the oxide semiconductor can be enhanced.

Next, the source electrode 512a and the drain electrode 512b which are apart from each other are formed on the oxide semiconductor film 511 (see FIG. 5B).

The source electrode 512a and the drain electrode 512b may be formed in such a manner that, for example, a conductive film (e.g., a metal film or a silicon film to which an impurity element imparting conductivity is added) is formed by a sputtering method, an etching mask is formed over the conductive film, and etching is performed. Alternatively, an ink-jet method may be used. Note that the conductive film to be the source electrode 512a and the drain electrode 512b may be formed by using a single layer or by stacking a plurality of layers. For example, the conductive film may be formed to have a three-layer structure in which an Al layer is sandwiched between Ti layers.

Next, the gate insulating film 513 is formed over at least the channel region of the oxide semiconductor film 511, and after the gate insulating film 513 is formed, an opening is formed (see FIG. 5C). The opening is formed so as to overlap with the gate electrode 504.

The gate insulating film 513 may be formed using an insulating material (e.g., silicon nitride, silicon nitride oxide, silicon oxynitride, silicon oxide, or the like) by a method employing high-density plasma, for example. Note that the gate insulating film 513 may be formed by using a single layer or by stacking a plurality of layers. Here, the gate insulating film 513 is formed to have a two-layer structure in which a silicon oxynitride layer is stacked over a silicon nitride layer. By using high-density plasma, plasma damage to the gate insulating film 513 can be reduced. Thus, the deficiencies resulting from dangling bonds in the gate insulating film 513 can be reduced, so that the interface with an oxide semiconductor formed later can be highly favorable.

In addition, the gate insulating film 513 is preferably an insulating oxide film because oxygen vacancies can be filled with oxygen by supplying oxygen to the channel region. Particularly, the gate insulating film 513 is preferably formed using an insulating oxide from which part of oxygen is released by heating. In other words, the materials given as examples of the material of the interlayer insulating film 505 are preferably used. When the portion of the gate insulating film 513 which is in contact with the oxide semiconductor film 511 is formed using silicon oxide, for example, oxygen can be diffused into the oxide semiconductor film 511 and a reduction in resistance of the transistor can be prevented.

Note that the gate insulating film 513 may be formed using a high-k material such as hafnium silicate ($HfSi_xO_y$ (x>0, y>0)), hafnium silicate ($HfSi_xO_y$ (x>0, y>0)) to which nitrogen is added, hafnium aluminate ($HfAl_xO_y$ (x>0, y>0)) to which nitrogen is added, hafnium oxide, yttrium oxide, or lanthanum oxide so that a gate leakage current can be reduced. Here, the gate leakage current refers to a leakage current which flows between a gate electrode and a source or drain electrode. Further, a layer formed using the high-k material and a layer formed using silicon oxide, silicon oxynitride, silicon nitride, silicon nitride oxide, aluminum oxide, aluminum oxynitride, or gallium oxide may be stacked. Note that even in the case where the gate insulating film 513 has a stacked-layer structure, the portion in contact with the oxide semiconductor film 511 is preferably formed using an insulating oxide.

The gate insulating film 513 may be formed by a sputtering method. The thickness of the gate insulating film 513 may be greater than or equal to 1 nm and less than or equal to 300 nm, preferably greater than or equal to 5 nm and less than or equal to 50 nm. When the thickness of the gate insulating film 513 is greater than or equal to 5 nm, the gate leakage current can be particularly reduced.

In addition, third heat treatment (preferably at a temperature higher than or equal to 200° C. and lower than or equal to 400° C., for example, at a temperature higher than or equal to 250° C. and lower than or equal to 350° C.) may be performed in an inert gas atmosphere or an oxygen gas atmosphere. By the third heat treatment, hydrogen or moisture remaining in the oxide semiconductor film 511 can be diffused into the gate insulating film 513. Furthermore, oxygen can be supplied to the oxide semiconductor film 511 from the gate insulating film 513.

The third heat treatment may be performed not only after the gate insulating film 513 is formed over the oxide semiconductor film 511 but also after the gate electrode 514a and a conductive film to be the electrode 514b are formed.

Next, a conductive film is formed over the gate insulating film 513, an etching mask is formed over the conductive film, and etching is performed, whereby the gate electrode 514a and the electrode 514b are formed (see FIG. 5D).

The gate electrode 514a and the electrode 514b may be formed using a material and a method which are similar to those for the source electrode 512a and the drain electrode 512b.

In the above-described manner, a transistor whose channel region is formed using an oxide semiconductor can be manufactured over a transistor formed using a semiconductor substrate as illustrated in FIG. 4.

The structures, methods, and the like described in this embodiment can be combined as appropriate with any of the structures, methods, and the like described in the other embodiments.

This application is based on Japanese Patent Application serial no. 2012-105233 filed with Japan Patent Office on May 2, 2012, the entire contents of which are hereby incorporated by reference.

What is claimed is:

1. A control circuit comprising:
   a signal processing circuit which comprises:
      an analog-to-digital converter configured to be supplied with a reference signal and a feedback signal which is output from a load;
      an arithmetic processing unit electrically connected to the analog-to-digital converter; and
      a first register electrically connected to the arithmetic processing unit,
   wherein the first register is configured to retain a signal output from the arithmetic processing unit,
   wherein the first register comprises a transistor comprising an oxide semiconductor in a channel region, and
   wherein the control circuit is configured to stop supply of a power supply potential to the signal processing circuit when voltages of the reference signal and the feedback signal are the same.

2. The control circuit according to claim 1, further comprising a pulse width modulator electrically connected to the arithmetic processing unit,
   wherein the pulse width modulator comprises:

a digital pulse width modulator which is electrically connected to the arithmetic processing unit and comprises a second register; and a clock generation circuit electrically connected to the digital pulse width modulator.

3. The control circuit according to claim 2, wherein the pulse width modulator is configured to retain the signal output from the arithmetic processing unit in the second register and to output one of a high level signal and a low level signal depending on a count number of a clock pulse output from the clock generation circuit.

4. An electronic device comprising:

the control circuit according to claim 2;

a switch comprising a gate, a source, and a drain; and the load electrically connected to one of the source and the drain of the switch, wherein the gate of the switch is electrically connected to the pulse width modulator.

5. The electronic device according to claim 4, wherein the load is selected from light emitting diode lighting and organic light emitting diode lighting.

6. The electronic device according to claim 4, wherein:

the analog-to-digital converter is configured to output a signal corresponding to a difference in voltage between the reference signal and the feedback signal to the arithmetic processing unit; and the signal output from the arithmetic processing unit corresponds to a summation of the signal output from the analog-to-digital converter and a signal output from the first register.

7. A method for driving an electronic device, the method comprising:

inputting, to an analog-to-digital converter, a reference signal and a feedback signal which is output from a load;

inputting a first signal corresponding to a difference in voltage between the reference signal and the feedback signal to an arithmetic processing unit from the analog-to-digital converter;

inputting a third signal to a second register included in a digital pulse width modulator from the arithmetic processing unit where the third signal is a summation of the first signal and a second signal input to the arithmetic processing unit from a first register;

outputting one of a high level signal and a low level signal from the digital pulse width modulator depending on a count number of a clock pulse which is input to the digital pulse width modulator from a clock generation circuit;

retaining the third signal in the first register; and turning off a signal processing circuit which includes the analog-to-digital converter, the arithmetic processing unit, and the first register.

8. The method according to claim 7, wherein the first register comprises a transistor whose channel region comprises an oxide semiconductor.

9. The method according to claim 7, wherein the one of the high level signal and the low level signal is input to a gate of a switch, and wherein one of a source and a drain of the switch is electrically connected to the load.

* * * * *